(12) United States Patent
Tahan

(10) Patent No.: US 7,802,111 B1
(45) Date of Patent: Sep. 21, 2010

(54) SYSTEM AND METHOD FOR LIMITING EXPOSURE OF CRYPTOGRAPHIC KEYS PROTECTED BY A TRUSTED PLATFORM MODULE

(75) Inventor: Thomas Tahan, La Jolla, CA (US)

(73) Assignee: Oracle America, Inc., Redwood City, CA (US)

( * ) Notice: Subject to any disclaimer, the term of this patent is extended or adjusted under 35 U.S.C. 154(b) by 1404 days.

(21) Appl. No.: 11/117,243

(22) Filed: Apr. 27, 2005

(51) Int. Cl.
G06F 12/14 (2006.01)

(52) U.S. Cl. .................. 713/193; 713/171; 380/259

(58) Field of Classification Search .......... 380/277, 380/278, 259; 713/200, 189, 278, 176, 164, 713/193, 171
See application file for complete search history.

(56) References Cited

U.S. PATENT DOCUMENTS

| | | | |
|---|---|---|---|
| 5,937,063 | A | 8/1999 | Davis |
| 6,609,199 | B1 | 8/2003 | DeTreville |
| 2003/0074548 | A1 | 4/2003 | Cromer et al. |
| 2004/0151319 | A1* | 8/2004 | Proudler ............... 380/277 |
| 2005/0066191 | A1* | 3/2005 | Thibadeau ............. 713/200 |
| 2005/0160281 | A1* | 7/2005 | Thibadeau ............. 713/189 |
| 2005/0213768 | A1* | 9/2005 | Durham et al. ........ 380/278 |
| 2006/0015717 | A1* | 1/2006 | Liu et al. ............... 713/164 |
| 2006/0015718 | A1* | 1/2006 | Liu et al. ............... 713/164 |
| 2006/0015732 | A1* | 1/2006 | Liu ........................ 713/176 |
| 2006/0236127 | A1* | 10/2006 | Kurien et al. .......... 713/193 |

FOREIGN PATENT DOCUMENTS

| | | |
|---|---|---|
| EP | 1 076 279 | 2/2001 |
| EP | 1 076 280 | 2/2001 |
| EP | 1 225 513 | 7/2002 |
| EP | 1 280 042 | 1/2003 |
| EP | 1 617 587 | 1/2006 |
| WO | WO 01/27723 | 4/2001 |
| WO | WO 2006/002368 | 1/2006 |

OTHER PUBLICATIONS

Ernie Brickell; Conference on Computer and Communications Security; Year of Publication: 2004 ; PORTAL; pp. 132-145.*
Alan Snyder, Encapsulation and inheritance in object-oriented programming languages; Year of Publication: 1986; AMC New York; pp. 38-45.*

* cited by examiner

Primary Examiner—Kambiz Zand
Assistant Examiner—Amare Tabor
(74) Attorney, Agent, or Firm—Martine Penilla & Gencarella, LLP

(57) ABSTRACT

A cryptographic module for limiting exposure of cryptographic keys protected by a trusted platform module (TPM) is provided. The cryptographic module includes logic for establishing a session with the TPM on behalf of a cryptographic client and logic for sending a request from the cryptographic client to the TPM to retrieve in plaintext a cryptographic key of the cryptographic client. Logic for receiving the cryptographic key in plaintext from the TPM are also included in cryptographic module. Further, cryptographic module includes logic for performing a cryptographic operation requested by the cryptographic client using the cryptographic key, and logic for sending the results of the cryptographic operation to the cryptographic client. A hardware-based method and system for limiting exposure of cryptographic keys also are described.

28 Claims, 5 Drawing Sheets

SYSTEM AND METHOD FOR LIMITING EXPOSURE OF CRYPTOGRAPHIC KEYS PROTECTED BY A TRUSTED PLATFORM MODULE

BACKGROUND

A trusted platform module (TPM) is a security component specified by the Trusted Computing Group, often implemented as a single chip. The TPM typically provides secure boot capability for a computing device as well as protected storage capability for protecting sensitive information such as cryptographic keys. When security conditions specified by TPM standards are satisfied, the TPM releases the protected cryptographic keys in plaintext into a host memory. A processor or a cryptographic peripheral may then use the cryptographic keys for cryptographic operations.

Potential vulnerabilities exist with the release of the protected cryptographic keys in plaintext. In particular, the cryptographic keys can easily be compromised by being exposed in plaintext outside a highly protected and controlled security boundary. In view of the foregoing, there is a need to provide system and method for limiting exposure of cryptographic keys protected by the TPM.

SUMMARY

Broadly speaking, the present invention fills these needs by providing hardware based methods and systems for limiting exposure of cryptographic keys protected by a trusted platform module (TPM). It should be appreciated that the present invention can be implemented in numerous ways, including as a method, a system, or a device. Several inventive embodiments of the present invention are described below.

In accordance with a first aspect of the present invention, a hardware-based method for limiting exposure of cryptographic keys protected by a TPM is provided. In this method, a session is first established with the TPM on behalf of a cryptographic client. Thereafter, a request from the cryptographic client is sent to the TPM to retrieve in plaintext a cryptographic key of the cryptographic client protected by the TPM. The cryptographic key is then received in plaintext from the TPM, and a cryptographic operation requested by the cryptographic client is performed using the cryptographic key. The results of the cryptographic operation are sent to the cryptographic client.

In accordance with a second aspect of the present invention, a cryptographic module for limiting exposure of cryptographic keys protected by a TPM is provided. The cryptographic module includes logic for establishing a session with the TPM on behalf of a cryptographic client and logic for sending to the TPM a request from the cryptographic client to retrieve in plaintext a cryptographic key of the cryptographic client protected by the TPM. Logic for receiving the cryptographic key in plaintext from the TPM is also included in the cryptographic module. Cryptographic module additionally includes logic for performing a cryptographic operation requested by the cryptographic client using the cryptographic key, and logic for sending the results of the cryptographic operation to the cryptographic client.

In accordance with a third aspect of the present invention, a system for limiting exposure of cryptographic keys protected by a TPM is provided. The system includes a cryptographic client, a cryptographic module in communication with the cryptographic client, and the TPM in communication with the cryptographic module. The cryptographic module includes a cryptographic service, whereby the cryptographic service includes logic for establishing a session with the TPM on behalf of the cryptographic client and logic for sending to the TPM a request from the cryptographic client to retrieve in plaintext a cryptographic key of the cryptographic client protected by the TPM. Further, the cryptographic service includes logic for receiving the cryptographic key in plaintext from the TPM and logic for performing a cryptographic operation requested by the cryptographic client using the cryptographic key, and logic for sending the results of the cryptographic operation to the cryptographic client.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for hardware based methods and systems for limiting exposure of cryptographic keys protected by a TPM. It will be obvious, however, to one skilled in the art, that the present invention may be practiced without some or all of these specific details. In other instances, well known process operations have not been described in detail in order not to unnecessarily obscure the present invention.

The embodiments described herein provide hardware based methods, cryptographic modules, and systems for limiting exposure of cryptographic keys protected by TPM. Essentially, cryptographic functions are performed in a hardware-protected environment isolated from the operating system and application programs. In one embodiment, as will be explained in more detail below, a cryptographic service is situated between a cryptographic client and the TPM. The cryptographic client cannot directly communicate with TPM to retrieve and utilize the cryptographic keys stored within the TPM. Instead, the cryptographic client communicates to the TPM through the cryptographic service. After the cryptographic keys are retrieved, the cryptographic service performs cryptographic operations requested by the cryptographic client using the retrieved cryptographic keys and returns the results to the cryptographic client.

Figure 1:
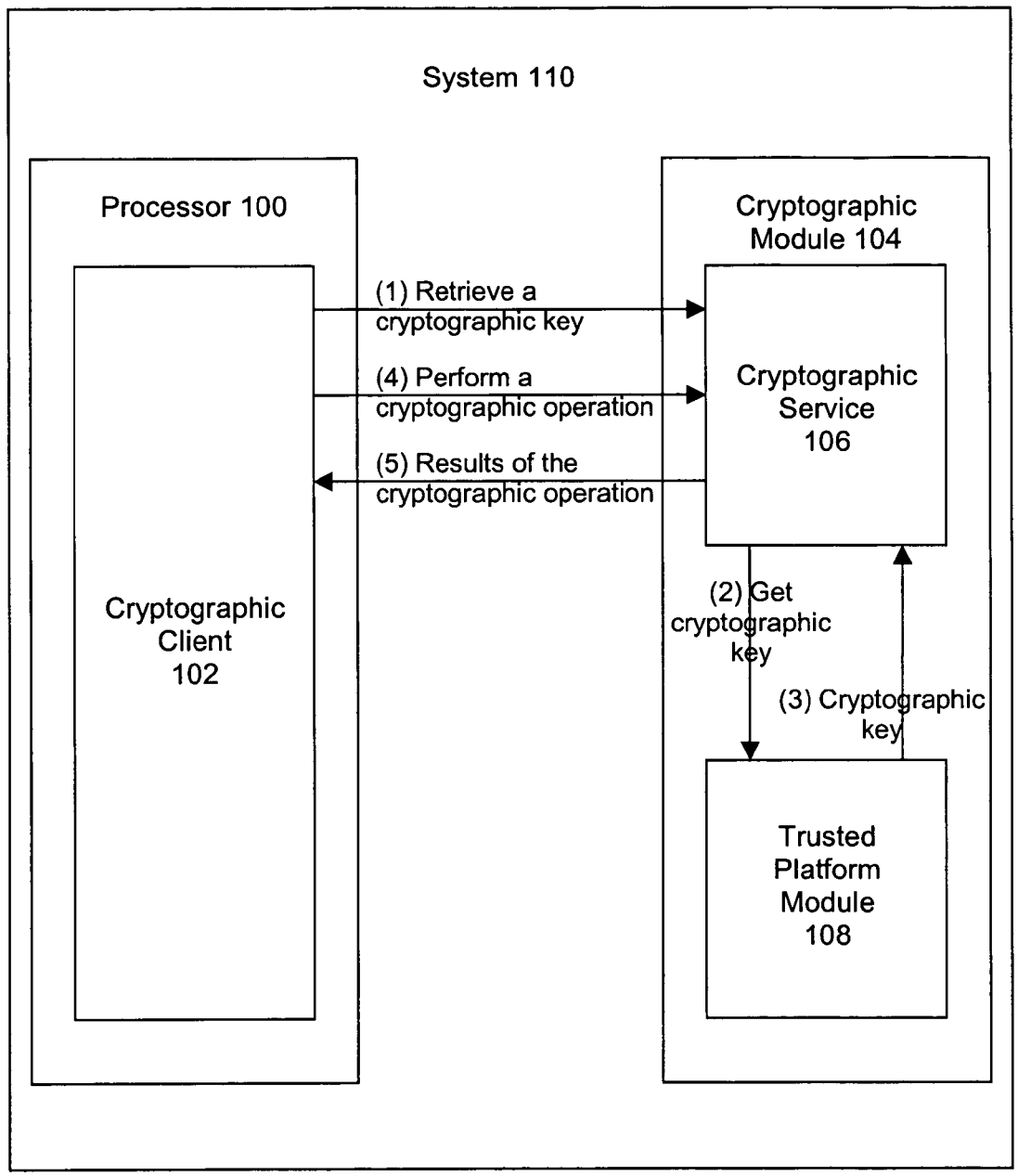
FIG. 1 is a simplified block diagram of a system for limiting exposure of cryptographic keys protected by a TPM with a cryptographic module encompassing the TPM, in accordance with one embodiment of the present invention.

FIG. 1 is a simplified block diagram of a system for limiting exposure of cryptographic keys protected by a TPM with a cryptographic module encompassing the TPM, in accordance with one embodiment of the present invention. As shown in FIG. 1, system 110 includes processor 100 and cryptographic module 104. Processor 100 is logic circuitry that responds to and processes the instructions that drive a computing device. Exemplary processor 100 includes Scalable Processor Architecture (SPARC) processors, Pentium processors, PowerPC processors, Opteron processors, Xeon processors, Itanium processors, etc. Cryptographic module 104 is a hardware-protected environment isolated from the operating system and application programs running within processor 100. In one embodiment, cryptographic module 104 may be a hardware module separate from processor 100, or may be logic in processor 100 that is isolated from application and operating system software executing on the processor. High assurance may be achieved by limiting the functionality of cryptographic module 104 to cryptographic and related security functions, through analysis and review, and by certification of the cryptographic module. In addition to logical isolation, cryptographic module 104 may have the capability to detect and protect against tampering by attackers having physical access. Exemplary embodiments of cryptographic module 104 include a chip, a board, an appliance compliant with the Federal Information Processing Standards (FIPS) 140 standard, etc.

Cryptographic client 102 is executed in processor 100 and, in one embodiment, cryptographic module 104 includes cryptographic service 106 and TPM 108. Cryptographic client 102 may include any suitable applications or services running on a platform and, as will be explained in more detail below, cryptographic service 106 includes the logic for limiting the exposure of cryptographic keys protected by TPM 108. It should be appreciated that TPM 108 is a security component specified by a Trusted Computing Group, often implemented as a single chip. TPM 108 provides secure boot capability for a computing device, as well as a protected storage capability for storing sensitive information such as cryptographic keys and integrity measurements. Specifically, the protected storage capability may be used to protect cryptographic keys on behalf of cryptographic client 102 running on a platform. Under control of cryptographic client 102, cryptographic keys may be created either within TPM 108 or external to the TPM, and may then be protected by the TPM.

As shown in FIG. 1, cryptographic client 102 first sends a request to cryptographic service 106 within cryptographic module 104 to access a cryptographic key protected (bound or sealed) by TPM 108. It should be appreciated that TPM 108 provides a service called bind, which encrypts the cryptographic key of cryptographic client 102 using a public key whose corresponding non-migratable private key is kept secret by the TPM. In addition, TPM 108 provides a service called seal, whereby the cryptographic key of cryptographic client 102 may be encrypted in a key derived from integrity measurements associated with the cryptographic client and other software or firmware (the measurements being stored within platform configuration registers within the TPM) and a non-migratable asymmetric key. If the cryptographic key of cryptographic client 102 is created externally to TPM 108, such as within cryptographic module 104, the cryptographic key is passed to the TPM for sealing using platform configuration registers relevant to the cryptographic client.

After receiving the request from cryptographic client 102, cryptographic service 106 sends a request to TPM 108 to unseal or unbind the cryptographic key. If security conditions specified by TPM standards are satisfied, TPM 108 returns or releases the protected cryptographic key to cryptographic service 106 in plaintext (i.e., the unencrypted form of an encrypted message) and the cryptographic service stores the cryptographic key within a secure key store of the cryptographic service. After TPM 108 releases the cryptographic key to cryptographic service 106, cryptographic client 102 sends a request to cryptographic service to perform a cryptographic operation using the retrieved cryptographic key. The request may include data to be operated upon. Cryptographic operation may include any suitable operation that is related to cryptography. Exemplary cryptographic operations include encrypting the data, decrypting the data, signing the data, signing a one-way hash of the data, verifying a signature of the data, verifying a signature on a one-way hash of the data, computing a message authentication code on the data, transforming the cryptographic key, etc. Cryptographic service 106 returns the results of the cryptographic operation (e.g., encrypted data, decrypted data, etc.) back to cryptographic client 102. The cryptographic operations may also include creating a cryptographic key and storing the cryptographic key, for which the key retrieval steps are omitted. Cryptographic keys created by cryptographic service 106 may be protected within TPM 108 either upon request of the cryptographic client 102, or per a policy specified by a trusted administrator via a secure administrative path to cryptographic module 104.

Figure 2:
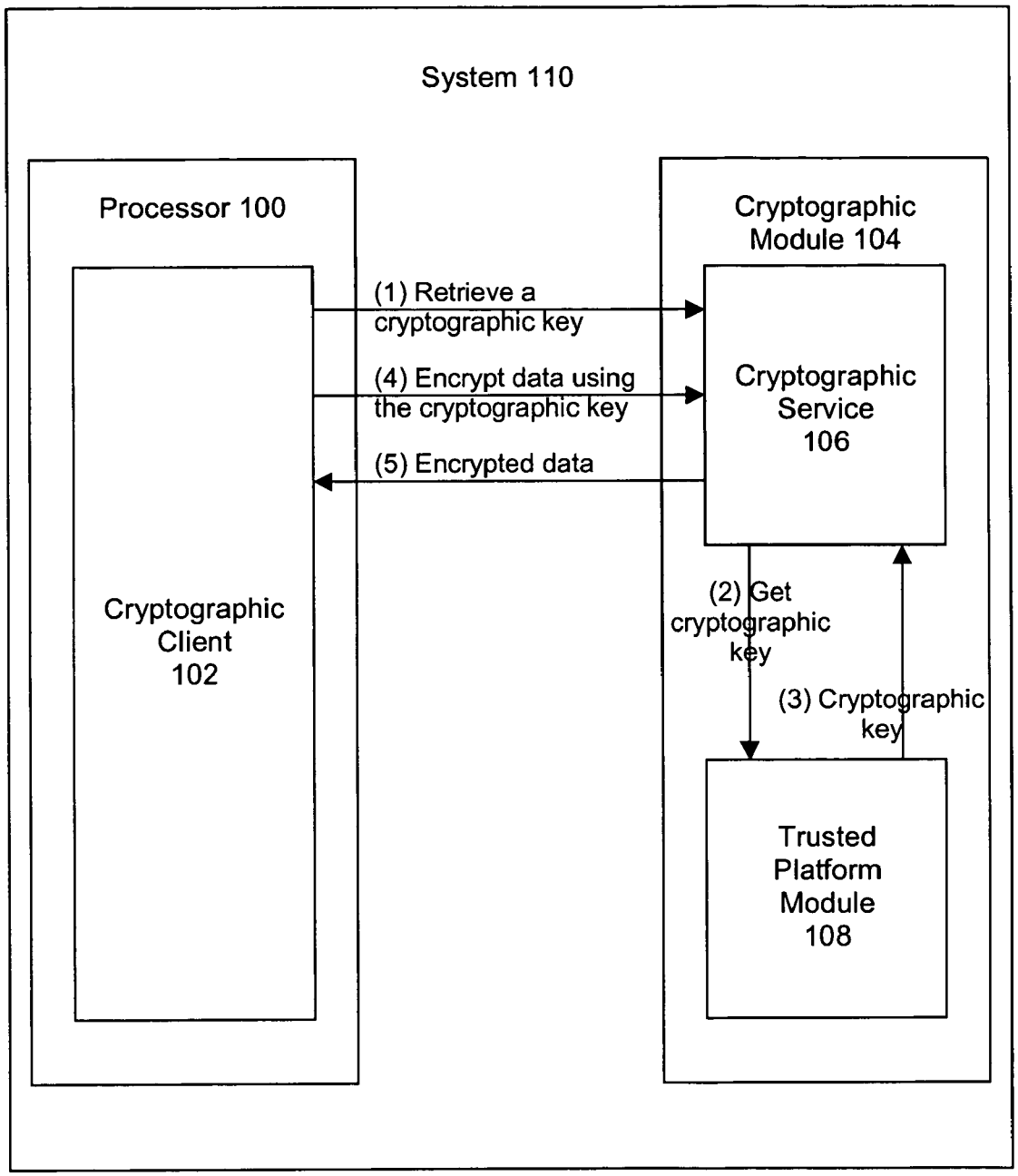
FIG. 2 is a simplified block diagram illustrating an exemplary cryptographic operation, in accordance with one embodiment of the present invention.

FIG. 2 is a simplified block diagram illustrating an exemplary cryptographic operation, in accordance with one embodiment of the present invention. As discussed above, cryptographic operation may include any suitable operation that is related to cryptography, and FIG. 2 shows an exemplary cryptographic encryption operation. System 110 is the same system described in FIG. 1. As will be explained in more detail below, a session is first established with TPM 108 and, as shown in FIG. 2, cryptographic client 102 then sends a request to cryptographic service 106 within cryptographic module 104 to retrieve the cryptographic client's cryptographic key. It should be appreciated that a request may be made for one cryptographic key or a set of cryptographic keys, and that cryptographic client 102 or cryptographic service 106 automatically tracks which of the cryptographic keys protected by TPM 108 belong to the cryptographic client.

After receiving the request from cryptographic client 102, cryptographic service 106 sends a request to TPM 108 to retrieve in plaintext the cryptographic client's cryptographic key protected by the TPM. In response, TPM 108 returns or releases the protected cryptographic key to cryptographic service 106 in plaintext. Cryptographic service 106 then stores the cryptographic key within a secure key store of the cryptographic service. Thereafter, cryptographic client 102 sends data to cryptographic service 106 and requests the cryptographic service to encrypt the data using the cryptographic key. Cryptographic service 106 receives the request and data, and encrypts the data using the cryptographic key received from TPM 108. After encryption, cryptographic service 106 sends the encrypted data back to cryptographic client 102.

Figure 3:
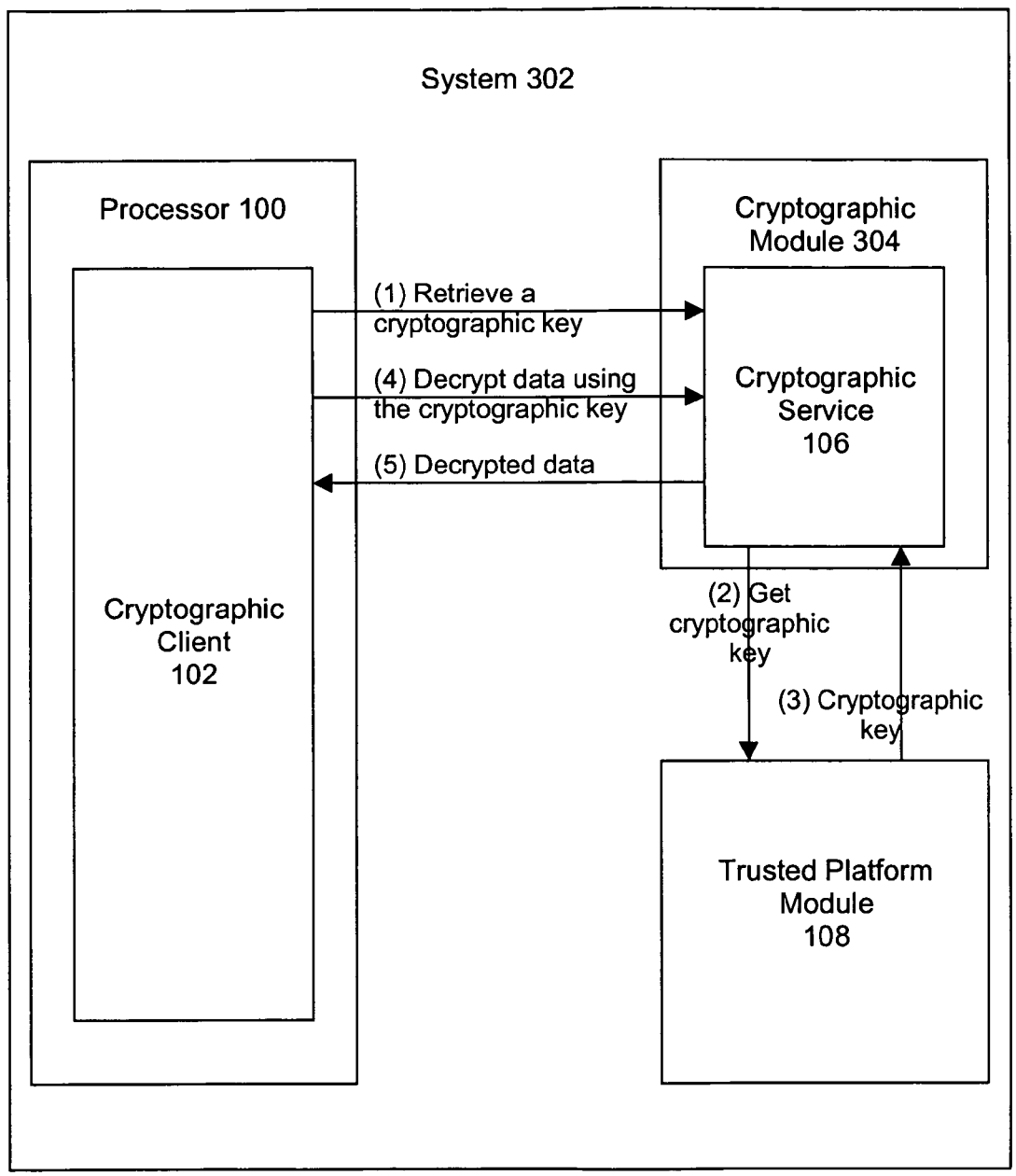
FIG. 3 is a simplified block diagram of a system with a cryptographic module in-line between a processor and a TPM, in accordance with one embodiment of the present invention.

FIG. 3 is a simplified block diagram of a system with a cryptographic module in-line between a processor and a TPM, in accordance with one embodiment of the present invention. As shown in FIG. 3, system 302 includes processor 100, cryptographic module 304, and TPM 108. In one embodiment, as shown in FIGS. 1 and 2, cryptographic module 304 may encapsulate TPM 108 or, in another embodiment, the TPM may be external to the cryptographic module as shown in FIG. 3. Specifically, the platform architecture may have cryptographic module 304 in-line between TPM 108 and cryptographic client 102. In this embodiment, the communication path between TPM 108 and cryptographic module 304 is protected. Cryptographic client 102 utilizes the cryptographic key stored within TPM 108 through cryptographic module 304. Cryptographic operations are performed either within cryptographic module 304 or TPM 108.

As discussed above, cryptographic operation may include any suitable operation that is related to cryptography, and FIG. 3 shows an exemplary cryptographic decryption operation. Cryptographic client 102 sends a request to cryptographic service 106 within cryptographic module 304 to retrieve the cryptographic client's cryptographic key. After receiving the request from cryptographic client 102, cryptographic service 106 sends a request to TPM 108 to retrieve in plaintext the cryptographic client's cryptographic key protected by the TPM. In response, TPM 108 returns or releases the protected cryptographic key to cryptographic service 106 in plaintext. Cryptographic service 106 receives the cryptographic key from TPM 108 in plaintext and stores the cryptographic key within a secure key store of the cryptographic service. Thereafter, cryptographic client 102 sends data to cryptographic service 106 and requests the cryptographic service to decrypt the data using the cryptographic key. Cryptographic service 106 receives the request and data, and decrypts the data using the cryptographic key received from TPM 108. After decryption, cryptographic service 106 sends the decrypted data back to cryptographic client 102.

Figure 4:
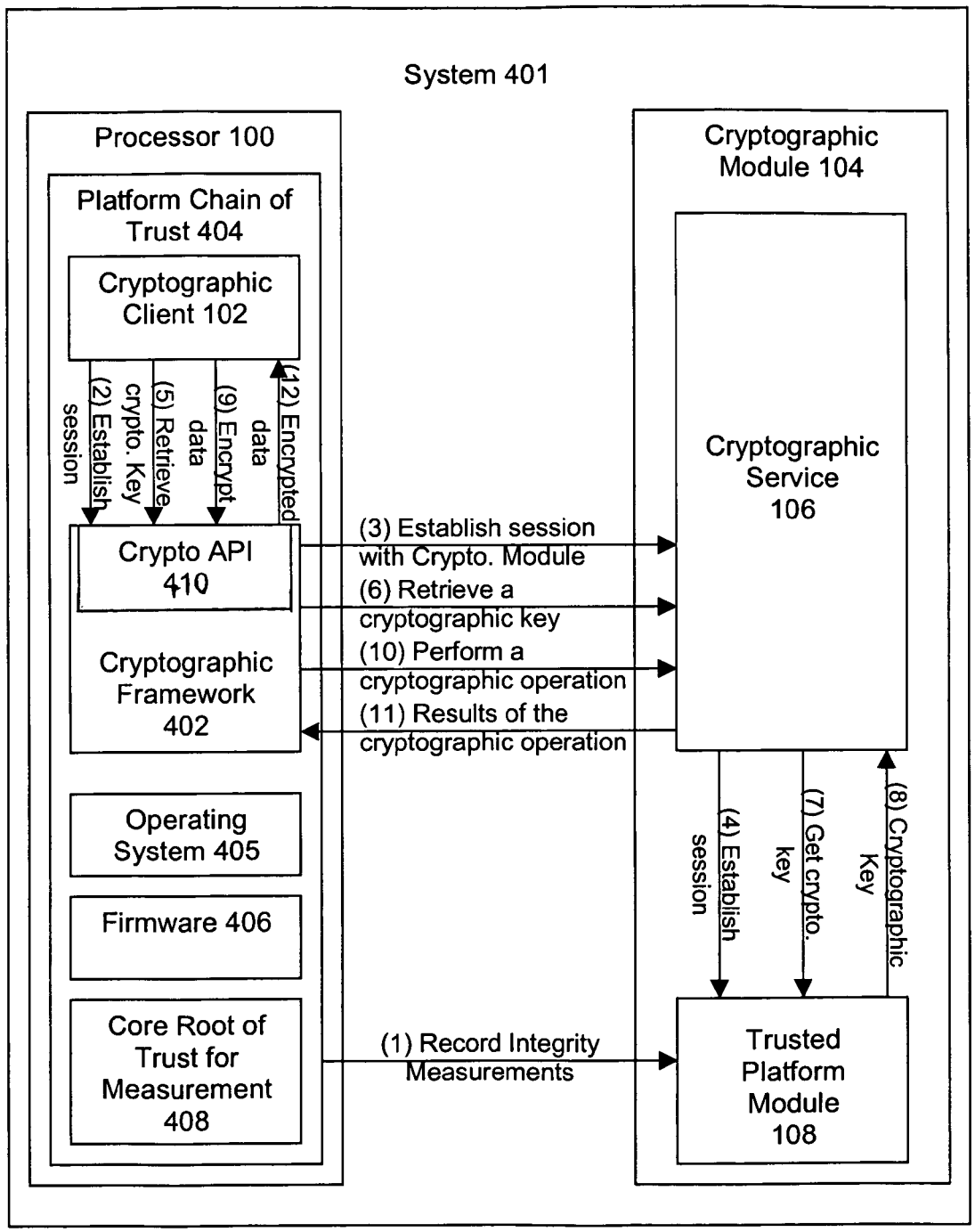
FIG. 4 is a simplified block diagram illustrating a cryptographic client utilizing a cryptographic framework's cryptographic application programming interface to access a cryptographic key protected by a TPM, in accordance with one embodiment of the present invention.

FIG. 4 is a simplified block diagram illustrating a cryptographic client utilizing a cryptographic framework through a cryptographic application programming interface (API) to access a cryptographic key protected by a TPM, in accordance with one embodiment of the present invention. As shown in FIG. 4, system 401 includes processor 100 and cryptographic module 104. Here, cryptographic module 104, with cryptographic service 106, encapsulates TPM 108. Cryptographic client 102 executed on processor 100 performs cryptographic operations by going through cryptographic framework 402. Cryptographic framework 402 may offer to clients any suitable industry standard cryptographic API 410. In one example, cryptographic framework 402 may offer the public key cryptographic system (PKCS) #11 API.

Further executed on processor 100 is platform chain of trust 404 that sends integrity measurements of the platform code to TPM 108 as the platform boots and software is loaded. To enable verification that the correct software and firmware components are loaded during a computer boot, integrity measurements (e.g., cryptographic checksums of computer code using an algorithm) are taken on each of the software and firmware components in the boot chain. Per Trusted Computing Group standards, the integrity measurement process starts at core root trust for measurement 408. The integrity measurement may include platform firmware 406, operating system 405, cryptographic framework 402 with its cryptographic API 410, cryptographic client 102, and any other software that cryptographic client depends on. For more information on integrity measurements, reference may be made to U.S. patent application Ser. No. 10/934,868 entitled "SYSTEMS AND METHODS FOR SECURING A COMPUTER BOOT," which is herein incorporated by reference.

After the platform boots, cryptographic client 102 may perform cryptographic operations using cryptographic keys protected by TPM 108. In the embodiment shown in FIG. 4, cryptographic client 102 may use a session-oriented cryptographic framework 402 with an API such as PKCS #11 to access a cryptographic key protected by TPM 108. A similar approach can be used for other cryptographic frameworks that do not have a session construct (e.g., by carrying client authentication information with each request). It should be appreciated that object attributes of cryptographic framework 402 are maintained for cryptographic keys protected by TPM 108. These object attributes may be assigned by a trusted administrator over a secure administrative path. For example, a cryptographic key attribute definition may be system wide, per user, or for each cryptographic key individually. System 401 may also define a correspondence between TPM 108 and cryptographic key attributes of cryptographic framework 402, either through system logic or under trusted administrator control. Similarly, cryptographic key attributes of TPM 108 are assigned to cryptographic keys of cryptographic framework 402 protected by the TPM. These cryptographic key attributes may also be assigned by a trusted administrator over a secure administrative path.

Still referring to FIG. 4, cryptographic client 102 then initiates the establishment of a session with Crypto Module 104 via cryptographic framework 402 by providing authentication information (e.g., a personal identification number) to the cryptographic framework. Cryptographic framework 402 relays this authentication information to cryptographic service 106 within cryptographic module 104. At the same time, information relating to which TPM's platform configuration registers are relevant to cryptographic client 102 (i.e., which platform configuration registers contain integrity measurements for the cryptographic client and the system software on which the client is dependent) may be sent from cryptographic framework 402, or configured by a trusted administrator over a secure administrative path.

Cryptographic service 106 then establishes a session with TPM 108 on behalf of cryptographic client 102. To establish the session, cryptographic service 106 determines cryptographic client 106's TPM identity and authorization data and sends it to TPM 108. The association between crypto module authentication information of cryptographic client 102 and TPM authorization data may be via an algorithm, or may be entered for each of the cryptographic client by a trusted administrator over a secure administrative path. Cryptographic client 102 then sends to cryptographic service 106 a request to use a cryptographic key protected by TPM 108. Cryptographic service 106 sends a request to TPM 108 for the protected cryptographic key. In response, TPM 108 returns the cryptographic key to cryptographic service 106 in plaintext, and the cryptographic service stores the cryptographic key in a secure key store. The cryptographic key is retained in the secure key store until the session between cryptographic client 102 and cryptographic module 104 is terminated, the cryptographic key is deleted, or the cryptographic module is reset or powered down.

After cryptographic service 106 receives the cryptographic key, cryptographic client 102 requests through cryptographic framework 402 that data sent by cryptographic client 102 be encrypted using the retrieved cryptographic key, and the cryptographic framework relays this request to the cryptographic service over the established session. Cryptographic service 106 validates the request, performs the cryptographic encryption operation using the cryptographic key stored in the secure key store, and sends the encrypted data back to cryptographic framework 402. After receiving the encrypted data, cryptographic framework 402 relays the encrypted data back to cryptographic client 102. Other cryptographic operations such as decrypt, sign, verify, compute message authentication code, etc. are performed in a similar manner. Multiple cryptographic operations may be performed within a single session.

Figure 5:
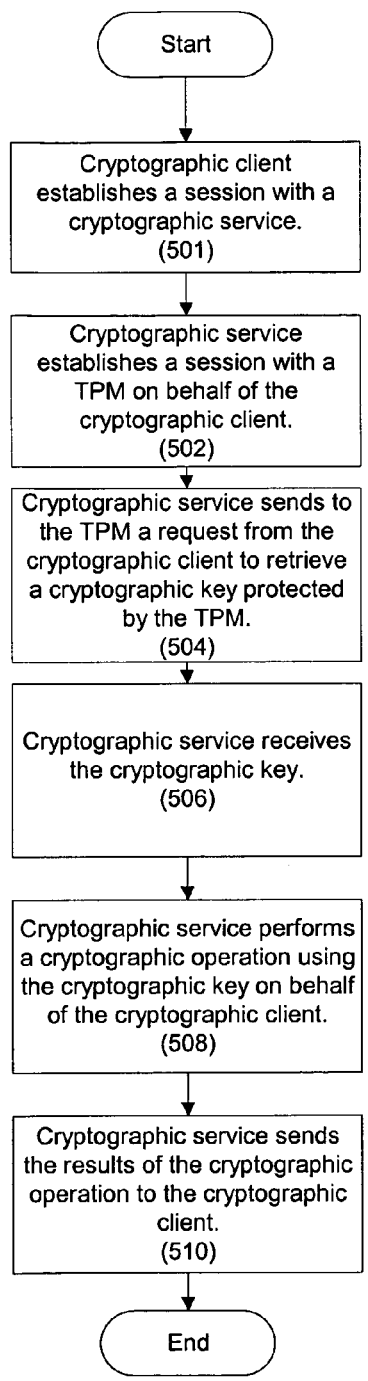
FIG. 5 is a high level flowchart illustrating the method operations for limiting exposure of cryptographic keys protected by a TPM, in accordance with one embodiment of the present invention.

FIG. 5 is a high level flowchart illustrating the method operations for limiting exposure of cryptographic keys protected by a TPM, in accordance with one embodiment of the present invention. Starting in operation 501, a cryptographic client establishes a session with a cryptographic service within a cryptographic module. Then, in operation 502, the cryptographic service establishes a session with the TPM on behalf of a cryptographic client. After the session is established, in operation 504, a cryptographic client sends a request to the TPM to retrieve in plaintext a cryptographic key of the cryptographic client protected by the TPM. In response, the cryptographic service receives the cryptographic key in plaintext from the TPM in operation 506. Upon request of the cryptographic client, a cryptographic operation is then performed in operation 508 using the cryptographic key. After the cryptographic operation, cryptographic service sends the results of operation 508 to the cryptographic client in operation 510.

It will be apparent to one skilled in the art that the functionality described herein may be synthesized into firmware through a suitable hardware description language (HDL) such as VERILOG. For example, the HDL may be employed to synthesize the firmware and the layout of the logic gates for providing the necessary functionality described herein to provide a hardware implementation of the limiting exposure techniques and associated functionalities.

In summary, the above described invention provides hardware based methods, cryptographic modules, and systems for limiting exposure of cryptographic keys protected by a TPM. The cryptographic module provides a hardware-protected environment that is isolated from the operating system and application programs. The cryptographic keys are never exposed in plaintext outside the cryptographic module even when the cryptographic keys are retrieved in plaintext from the TPM. Accordingly, the introduction of the cryptographic module limits the exposure of cryptographic keys. Additionally, as described above, an application that uses a cryptographic API can benefit from the protected storage capabilities of a TPM without being modified.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A hardware-based method for limiting exposure of cryptographic keys protected by a trusted platform module (TPM), the hardware comprising:
   a processor;
   a cryptographic client executed in the processor;
   a hardware cryptographic module, in communication with the cryptographic client, and the cryptographic module including a cryptographic service performing the operations of:
   establishing, a session with the TPM on behalf of a cryptographic client;
   sending a request from the cryptographic client to the TPM to retrieve in plaintext a cryptographic key of the cryptographic client protected by the TPM;
   receiving the cryptographic key in plaintext from the TPM;
   performing a cryptographic operation requested by the cryptographic client using the cryptographic key; and
   sending results of the cryptographic operation to the cryptographic client;
   wherein the cryptographic module encapsulating the TPM and the cryptographic service; and wherein the cryptographic module is isolated from any private network connection.

2. The hardware-based method of claim 1, wherein an application programming interface (API) based on Public Key Cryptographic Standard (PKCS) 11 allows the cryptographic client to communicate with the cryptographic module.

3. The hardware-based method of claim 1, wherein the method operation of establishing the session with the TPM on behalf of the cryptographic client includes,
   authenticating the cryptographic client; and
   sending authorization data for the cryptographic client to the TPM.

4. The hardware-based method of claim 3, wherein the method operation of sending the authorization data for the cryptographic client to the TPM includes,
   mapping cryptographic module identity and authentication information of the cryptographic client to TPM identity and authorization data of the cryptographic client.

5. The hardware-based method of claim 4, wherein the method operation of mapping the cryptographic module identity and authentication information includes,
   computing the TPM identity and authorization data from the cryptographic module identity and authentication information using an algorithm; and
   providing a capability to configure the mapping using a secure administrative path.

6. The hardware-based method of claim 3, wherein the method operation of authenticating the cryptographic client includes,
   receiving information regarding which platform configuration registers are relevant to the cryptographic client.

7. The hardware-based method of claim 3, wherein the method operation of authenticating the cryptographic client includes,
   receiving authentication information from the cryptographic client.

8. The hardware-based method of claim 1, wherein the method operation of sending the request includes,
   sending to the TPM information regarding which platform configuration registers are relevant to the cryptographic client; and
   requesting the TPM to unseal or unbind the cryptographic key.

9. The hardware-based method of claim 1, further comprising:
   maintaining cryptographic application programming interface object attributes for the cryptographic key protected by the TPM.

10. The hardware-based method of claim 1, further comprising:
    creating the cryptographic key; and
    sending the created cryptographic key to the TPM to be protected.

11. A hardware cryptographic module including a cryptographic service for limiting exposure of cryptographic keys protected by a trusted platform module (TPM), comprising:
    logic for establishing a session with the TPM on behalf of a cryptographic client;
    logic for sending a request from the cryptographic client to the TPM to retrieve in plaintext a cryptographic key of the cryptographic client protected by the TPM;
    logic for receiving the cryptographic key in plaintext from the TPM;
    logic for performing a cryptographic operation requested by the cryptographic client using the cryptographic key; and
    logic for sending results of the cryptographic operation to the cryptographic client;
    wherein the cryptographic module encapsulates the TPM and the cryptographic service; and wherein the cryptographic module is isolated from any private network connection.

12. The cryptographic module of claim 11, wherein an application programming interface (API) based on Public Key Cryptographic Standard (PKCS) 11 allows the cryptographic client to communicate with the cryptographic module.

13. The cryptographic module of claim 11, wherein the logic for establishing the session with the TPM on behalf of the cryptographic client includes,
    logic for authenticating the cryptographic client; and
    logic for sending authorization data for the cryptographic client to the TPM.

14. The cryptographic module of claim 13, wherein the logic for sending the authorization data for the cryptographic client to the TPM includes,
    logic for mapping cryptographic module identity and authentication information of the cryptographic client to TPM identity and authorization data of the cryptographic client.

15. The cryptographic module of claim 14, wherein the logic for mapping the cryptographic module identity and authentication information includes,
    logic for computing the TPM identity and authorization data from the cryptographic module identity and authentication information using an algorithm; and
    logic for providing a capability to configure the mapping using a secure administrative path.

16. The cryptographic module of claim 13, wherein the logic for authenticating the cryptographic client includes,
    logic for receiving information regarding which platform configuration registers are relevant to the cryptographic client.

17. The cryptographic module of claim 13, wherein the logic for authenticating the cryptographic client includes,
    logic for receiving authentication information from the cryptographic client.

18. The cryptographic module of claim 11, wherein the logic for sending the request includes,
    logic for sending to the TPM information regarding which platform configuration registers are relevant to the cryptographic client; and
    logic for requesting the TPM to unseal or unbind the cryptographic key.

19. The cryptographic module of claim 11, further comprising:
    logic for creating the cryptographic key; and
    logic for sending the created cryptographic key to the TPM to be protected.

20. A system for limiting exposure of cryptographic keys protected by a trusted platform module (TPM), comprising:
    a processor;
    a cryptographic client executed in the processor;
    a hardware cryptographic module in communication with the cryptographic client, the cryptographic module including a cryptographic service, the cryptographic service including:
        logic for establishing a session with the TPM on behalf of the cryptographic client, logic for sending a request from the cryptographic client to the TPM to retrieve in plaintext a cryptographic key of the cryptographic client protected by the TPM,
        logic for receiving the cryptographic key in plaintext from the TPM,
        logic for performing a cryptographic operation requested by the cryptographic client using the cryptographic key, and
        logic for sending results of the cryptographic operation to the cryptographic client; and
    the TPM in communication with the cryptographic module, wherein the cryptographic module encapsulates the TPM and the cryptographic service; and wherein the cryptographic module is isolated from any private network connection.

21. The system of claim 20, wherein an application programming interface (API) based on Public Key Cryptographic Standard (PKCS) 11 allows the cryptographic client to communicate with the cryptographic module.

22. The system of claim 20, wherein the logic for establishing the session with the TPM on behalf of the cryptographic client includes,
    logic for authenticating the cryptographic client; and
    logic for sending authorization data for the cryptographic client to the TPM.

23. The system of claim 22, wherein the logic for sending the authorization data for the cryptographic client to the TPM includes, logic for mapping cryptographic module identity and authentication information of the cryptographic client to TPM identity and authorization data of the cryptographic client.

24. The system of claim 23, wherein the logic for mapping the cryptographic module identity and authentication information includes,
    logic for computing the TPM identity and authorization data from the cryptographic module identity and authentication information using an algorithm; and
    logic for providing a capability to configure the mapping using a secure administrative path.

25. The system of claim 22, wherein the logic for authenticating the cryptographic client includes,
   logic for receiving information regarding which platform configuration registers are relevant to the cryptographic client.

26. The system of claim 22, wherein the logic for authenticating the cryptographic client includes,
   logic for receiving authentication information from the cryptographic client.

27. The system of claim 20, wherein the logic for sending the request includes,
   logic for sending to the TPM information regarding which platform configuration registers are relevant to the cryptographic client; and
   logic for requesting the TPM to unseal or unbind the cryptographic key.

28. The system of claim 20, wherein the cryptographic service further includes,
   logic for creating the cryptographic key; and
   logic for sending the created cryptographic key to the TPM to be protected.

\* \* \* \* \*